United States Patent [19]

Lawson-Tancred

[11] 4,280,061

[45] Jul. 21, 1981

[54] METHOD AND APPARATUS FOR GENERATING ELECTRICITY FROM A FIXED PITCH WIND WHEEL

[75] Inventor: Henry Lawson-Tancred, Boroughbridge, England

[73] Assignee: Sir Henry Lawson-Tancred, Sons & Co. Ltd., Yorkshire, England

[21] Appl. No.: 954,471

[22] Filed: Oct. 25, 1978

[51] Int. Cl.³ .......................... F03D 9/00; H02P 9/04; F16D 31/02; F01B 25/06
[52] U.S. Cl. .................................... 290/55; 290/44; 60/398; 417/334; 415/30
[58] Field of Search ...................... 290/44, 55; 415/30; 417/334; 60/398; 416/43

[56] References Cited

U.S. PATENT DOCUMENTS

| | | | |
|---|---|---|---|
| 1,366,844 | 1/1921 | Snee | 290/44 |
| 3,269,121 | 8/1966 | Bening | 60/52 |
| 3,974,395 | 8/1976 | Bright | 290/44 |
| 4,149,092 | 4/1979 | Cros | 290/54 |

*Primary Examiner*—J. V. Truhe
*Assistant Examiner*—John B. Conklin
*Attorney, Agent, or Firm*—Oblon, Fisher, Spivak, McClelland & Maier

[57] ABSTRACT

A method and apparatus for generating electricity from wind energy, wherein a wind wheel is connected to drive an energy converter which effects a torque reaction on the wind wheel proportional to the square of the rotational speed of the wheel, so that the wheel may be operated at fixed blade pitch and the blade tip speed will be proportional to the wind speed. The wind wheel may be connected to drive an electric generator to generate electrical energy in synchronism with mains supply.

13 Claims, 5 Drawing Figures

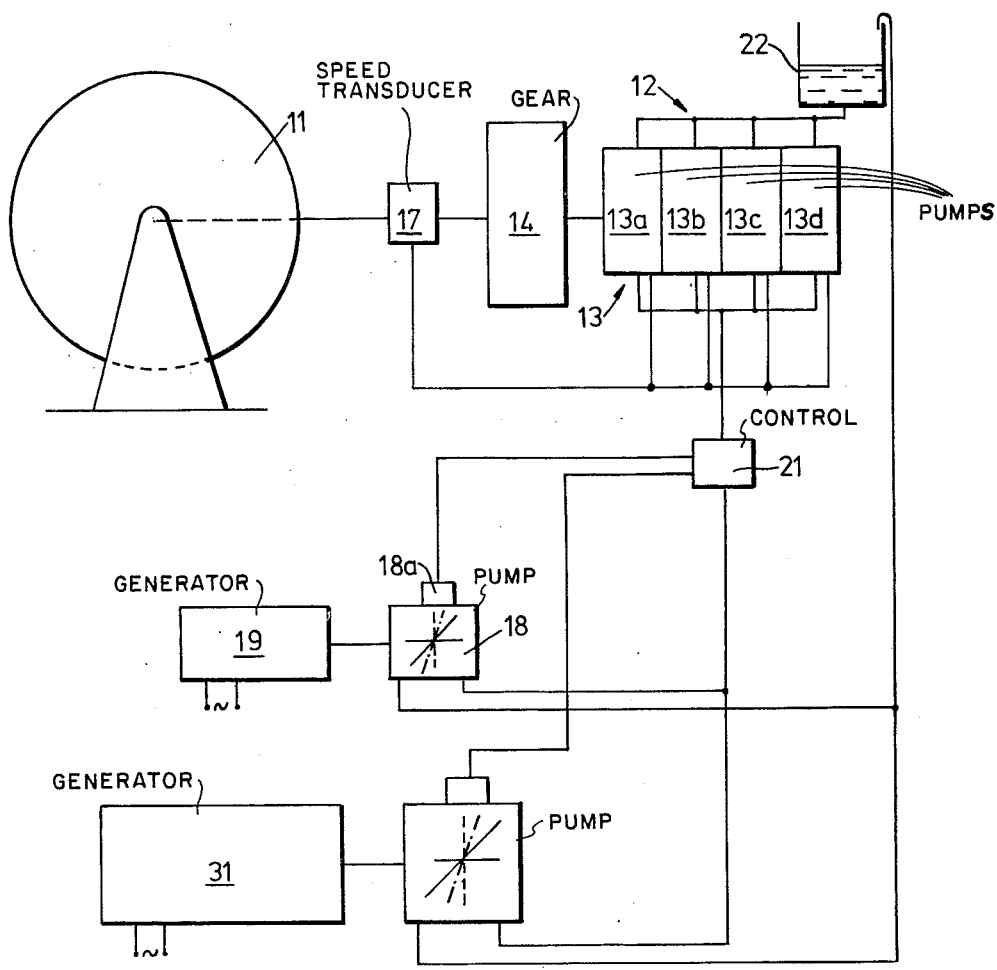
—FIG.3.—

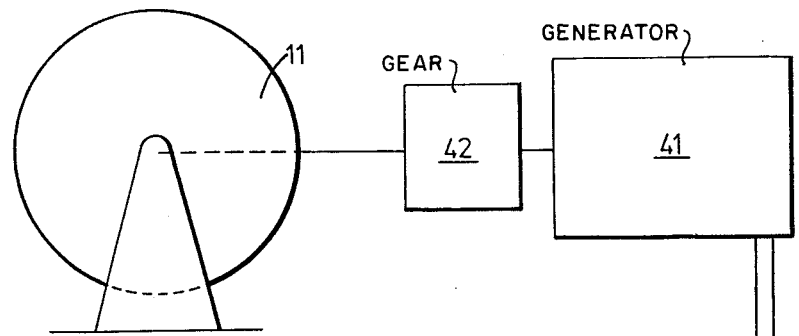
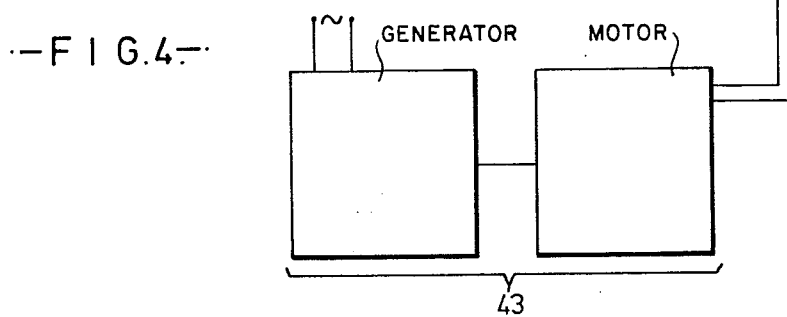
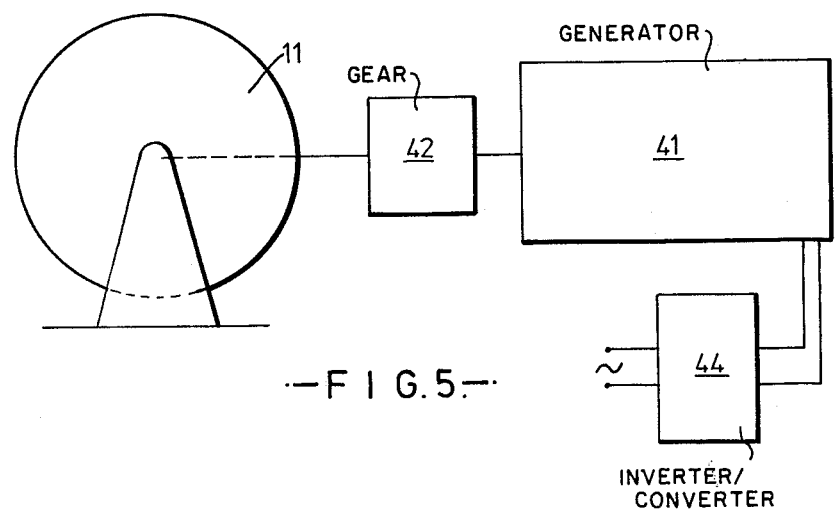

METHOD AND APPARATUS FOR GENERATING ELECTRICITY FROM A FIXED PITCH WIND WHEEL

This invention relates to methods of operating a wind wheel for taking power from the wind, and especially to the production of electricity thereby.

Fixed pitch wind wheels are simpler and less expensive than variable pitch wheels, and have less opportunity to break down. However, a fixed pitch wheel connected to drive an electric generator in a conventional way is only operable efficiently over a narrow range of wind speeds, and is not operable at all when the wind speed is very different from that for which the arrangement is designed—usually average wind speed for the locality.

Another problem in the production of electricity from wind wheels is the question of what to do with the electricity produced. It is of course possible to store it in electric accumulators, but this is expensive and relatively inefficient. Furthermore, the rate of production of electricity is not constant, nor is the rate of rotation of the wind wheel, so that a constant frequency cannot be produced directly.

The present invention solves the first of these problems, and makes possible an economic solution to the second.

The invention comprises a method for operating a wind wheel for taking power from the wind over a range of wind speeds, in which the wind wheel is connected to drive an energy converter that effects a torque reaction on the wheel at least roughly proportional to the square of the rotational speed of the wind wheel.

In this way, a wind wheel can be operated at fixed blade pitch so that its blade tip speed is always proportional to the wind speed. Also, the wind wheel is operated at its maximum effectiveness at all times and the output is at the peak of the power curve.

The wind wheel may drive hydraulic pump means, which may be of a type having continuously variable torque characteristics, such as a variable angle swash plate pump. The swash plate angle will then be controlled by a wind wheel speed sensing arrangement. The hydraulic pump means may, however, have stepwise variable torque characteristics, and may, for example, comprise a plurality of gear pumps (a gear pump has a torque proportional to speed) and bypasses operable by a wind wheel speed sensing arrangement so that at low wind speeds only one pump is on torque, and at higher wind speeds others of the pumps are on torque as well.

In one method for generating electricity from the wind, according to the present invention, a wind wheel is connected to drive an electric generator via an energy converter that effects a torque reaction on the wheel at least roughly proportional to the square of the rotational speed of the wind wheel. It may now be arranged that the electric generator is connected to and rotates in synchronism with the mains supply or in other words, in synchronism with supply line voltage frequency, energy from the energy converter being fed to drive the generator at such speed at whatever power is being produced from the wind wheel. Thus a large wind wheel, or a wind wheel "farm", can be used to generate power for the national grid, or a small domestic wheel can be used to feed energy produced in excess of local demand back into the mains, driving the meter backwards. This eliminates the problem of storage. Whenever there is an excess of local demand over local supply, the difference is made up from the mains supply. Only this difference registers on the meter.

However, the energy converter itself may comprise electric generator means operating at variable speed depending on the wind wheel rotational speed, the torque of said generator means being arranged to be proportional to the rotational speed of the wind wheel. The output of said generator means can then be inverted (if d.c.) or converted (if a.c.) to mains frequency, as by a motor-generator set or by a static inverter or static converter.

The invention also comprises an apparatus for use with a wind wheel for taking power from the wind, comprising an energy converter adapted for connection to a wind wheel and to effect a torque reaction thereon at least roughly proportional to the square of the rotational speed of the wind wheel.

Said energy converter may be adapted for direct connection to the wind wheel or for connection via fixed ratio gearing.

Methods and apparatus for operating and producing electricity from a wind wheel according to the invention will now be described with reference to the accompanying drawings in which:

FIG. 3 is a schematic diagram of a third embodiment,

FIG. 4 is a schematic diagram of a fourth embodiment, and

FIG. 5 is a schematic diagram of a fifth embodiment.

The Figures illustrate methods of operating wind wheels 11 for taking power from the wind over a range of wind speeds in which the wind wheel 11 is connected to drive an energy converter 12 that effects a torque reaction on the wheel 11 at least roughly proportional to the square of the rotational speed of the wind wheel 11.

The wind wheels 11 can be fixed pitch wheels, since variable pitch is not required. However, variable pitch wheels can of course be used though they may be operated at a selected, fixed pitch.

Figure 1:
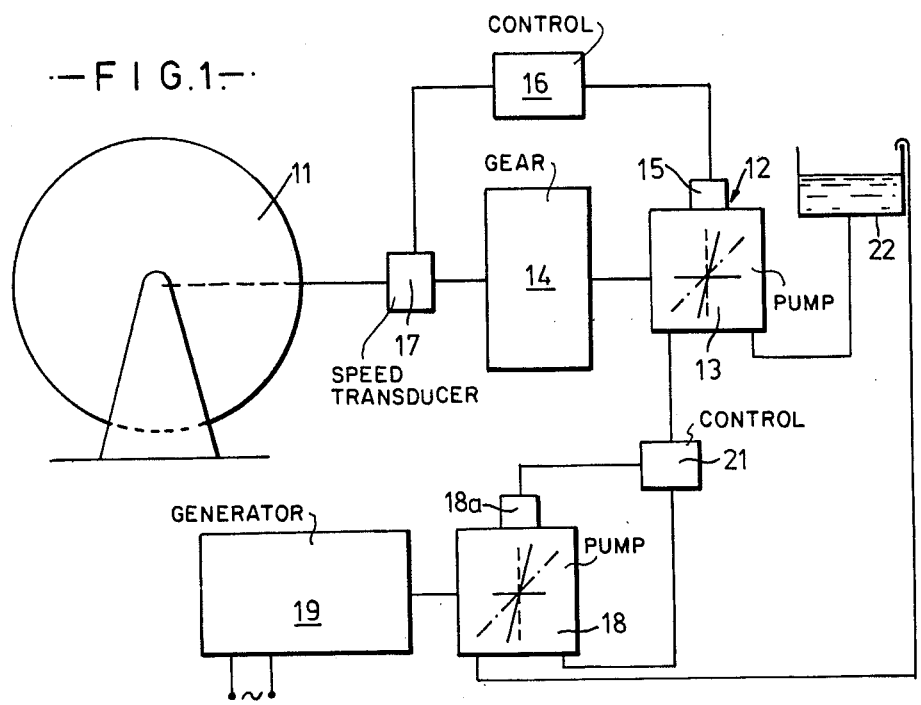
FIG. 1 is a schematic diagram of a first embodiment of apparatus.
Figure 2:
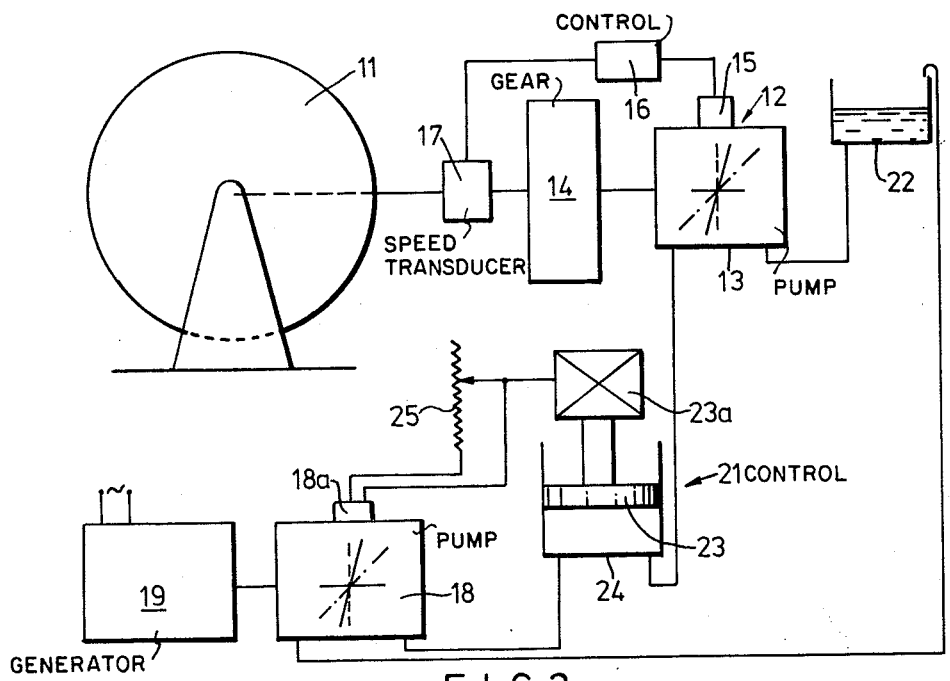
FIG. 2 is a schematic diagram of a second embodiment.

FIGS. 1 to 3 show the wind wheel 11 driving hydraulic pump means 13. FIGS. 1 and 2 show the pump means 13 as a variable angle swash plate pump. The wind wheel 11 drives the pump 13 via fixed ratio gearing 14. The swash plate angle controller 15 is actuated in any suitable manner by a conventional control arrangement 16 in accordance with a signal from a shaft speed transducer 17.

The hydraulic fluid output of the pump 13 is fed to an hydraulic motor 18 which drives a mains synchronous generator 19. The motor 18 is a variable angle swash plate motor whose swash plate angle controller 18a is operated by a suitable, conventional control arrangement 21 that acts to maintain a constant hydraulic pressure in the circuit.

As the wind wheel 11 rotates faster at higher wind speeds, the control arrangement 16 increases the swash plate angle to increase the torque loading on the wind wheel and keep its tip speed proportional to wind speed. This delivers more hydraulic fluid to the motor 18. The swash plate angle of the motor 18 is increased by the control arrangement 21 so that the motor accepts the increased output of hydraulic fluid at constant pressure, and increases its power output to the generator. The generator, being synchronised with the mains supply, constrains the motor 18 to run at constant speed.

Spent hydraulic fluid is returned to a header tank 22 supplying the pump 13.

FIG. 2 shows a similar arrangement in which the control arrangement 21 comprises an hydraulic accumulator comprising a piston 23 operating in a cylinder 24. The piston 23 is loaded with a weight 23a that determines the pressure in the system. As more fluid is output from the pump 13, the piston rises in the cylinder and operates the swash plate controller 18a via a potentiometer 25, so that the swash plate angle is increased and the motor 18 accepts fluid at a higher throughput rate so as to stabilise the level of the piston 23.

FIG. 3 shows another arrangement in which the pump means 13 comprise four gear pumps 13a, 13b, 13c, 13d. The pumps are all connected to be rotated all the time at the output shaft speed of the gearing 14. However suitable, conventional, bypass means, not shown, are operated in accordance with shaft speed (sensed by transducer 17) so that at low speeds only pump 13a is on torque, and at progressively higher speeds, pumps 13b, 13c and 13d are brought on torque.

FIG. 3 also shows an arrangement in which a second generator 31 can be brought in at higher wind speeds. The second generator need not be synchronous, and may be connected to a purely resistive load for domestic heating purposes—perhaps for storing heat in a large heat sink to be pumped out later on. This may be useful particularly where the system is to be used in country areas where the mains network could not accept large power inputs. The generator 19 might typically be a 5KW generator, and the generator 31 a 25 or 30KW generator. The larger generator may be cut in on a signal that the smaller generator is already running at maximum power output, or that the swash plate of the motor 18 is already at its maximum permitted angle.

FIGS. 4 and 5 show arrangements in which hydraulic energy converters are not used. The same torque characteristics are, however, provided in generator means 41 connected to be driven directly (through fixed ratio gearing 42) from the wind wheel 11. The desired speed—dependent torque characteristics can be provided either in a stepwise fashion, by having, say, four identical generators which are brought successively on load as shaft speed increases, or by a single generator which, by switching in coils or groups of coils has a more nearly continuously variable torque characteristic.

FIG. 4 shows such an arrangement driving a motor generator set 43 connected to run synchronously with the mains supply. FIG. 5 shows the generator means 41—which can be either an a.c. generator or a d.c. generator—connected to a static converter or inverter 44, respectively, controlled to produce mains-synchronous alternating current.

All these arrangements enable fixed pitch wind wheels to operate and produce electricity efficiently over a wide range of wind speeds, and to produce electricity, moreover, that can be "stored" in the mains network without the use of complicated phase angle matching arrangements.

Moreover, two or more wind wheels can be joined to the same hydraulic or other energy conversion arrangements if desired.

What I claim is:

1. A method for generating electricity from wind using hydraulic pump means, variable hydraulic motor means and a wind wheel with fixed pitch hydraulically connected to a generator which comprises:
   driving said generator by said wind wheel at a fixed rotational speed,
   operating said wind wheel at optimum tip speed by driving said hydraulic pump means connected therewith;
   controlling driving of said hydraulic pump means to effect a torque reaction on the wheel at least roughly proportional to the square of the rotational speed of the wind wheel;
   supplying variable hydraulic pressure by said pump means to said motor means for driving said generator;
   controlling operation of said motor means such as to maintain constant hydraulic pressure in the system while driving said generator at said fixed speed; and
   obtaining a frequency synchronous with mains frequency.

2. A method according to claim 1, including the step of connecting said generator to the mains supply for supplying said generated electricity to the mains supply.

3. A method according to claim 1 or claim 2, wherein said step of controlling driving of said hydraulic pump means comprises controlling continuously variable torque characteristics of said hydraulic pump means.

4. A method according to claim 1 or claim 2, wherein said step of controlling driving of said hydraulic pump means comprises controlling stepwise variable torque characteristics of said hydraulic pump means.

5. A method according to claim 1 or claim 2 wherein said step of controlling driving of said hydraulic pump means comprises sensing wind wheel rotational speed.

6. Apparatus for generating electricity from a wind wheel with fixed pitch, comprising:
   hydraulic pump means connected to be driven by said wind wheel;
   means for controlling said hydraulic pump means in accordance with the wind wheel's rotational speed to effect a torque reaction on said wind wheel proportional to the square of such speed;
   variable hydraulic motor means driven by said pump means;
   an electric generator connected to be driven by said hydraulic motor means; and
   control means for said motor means to vary the torque characteristics thereof so as to maintain a constant hydraulic pressure while driving said generator at a fixed speed.

7. Apparatus according to claim 6, said generator comprising a mains-synchronous generator for generating electricity at a frequency synchronous to the frequency of mains supply voltage.

8. Apparatus according to claim 6 or claim 7, said means for controlling said hydraulic pump means comprising means for continuously controlling variable torque characteristics of said pump means.

9. Apparatus according to claim 8, said means for controlling said hydraulic pump means comprising a variable angle swash plate member.

10. Apparatus according to claim 6 or claim 7, said means for controlling said pump means comprising means for stepwise variably controlling torque characteristics of said pump.

11. Apparatus according to claim 10, in which said pump means comprise a plurality of gear pumps and bypasses, and further comprising:
  a wind wheel rotational speed sensing means connected to operate the gear pumps so that at low speeds, one pump is on torque, and at higher speeds others of the pumps are on torque as well.

12. Apparatus according to claim 7 or claim 9, in which said motor means comprises a variable angle swash plate motor.

13. Apparatus according to claim 6 or claim 7 or claim 9, in which said control means for said motor comprises:
  a double acting piston-in-cylinder motor adjustment device connected to adjust the motor means; and
  a potentiometer connected to the motor adjustment device, so that the motor means is adjusted to accept a higher flow at constant pressure when the flow from the pump means increases, and a lower flow at constant pressure when the flow from the pump means decreases, whereby the power output of said generator varies but not the speed thereof in accordance with variations in the rotational speed of the wind wheel.

* * * * *